(12) United States Patent
Luik

(10) Patent No.: US 7,559,593 B2
(45) Date of Patent: Jul. 14, 2009

(54) PROTECTIVE DEVICE FOR A LOADING SPACE

(75) Inventor: Klaus Luik, Muehlacker (DE)

(73) Assignee: Dr. Ing. h.c. F. Porsche AG, Weissach (DE)

( * ) Notice: Subject to any disclaimer, the term of this patent is extended or adjusted under 35 U.S.C. 154(b) by 5 days.

(21) Appl. No.: 11/829,122

(22) Filed: Jul. 27, 2007

(65) Prior Publication Data

US 2008/0023978 A1    Jan. 31, 2008

(30) Foreign Application Priority Data

Jul. 27, 2006   (DE) ...................... 10 2006 034 635

(51) Int. Cl.
 *B60N 3/12* (2006.01)
(52) U.S. Cl. ................. 296/37.16; 296/24.43
(58) Field of Classification Search ............. 296/37.16, 296/39.1, 39.2
See application file for complete search history.

(56) References Cited

U.S. PATENT DOCUMENTS

| | | | | |
|---|---|---|---|---|
| 5,288,122 | A * | 2/1994 | Pilhall | 296/37.16 |
| 5,469,895 | A * | 11/1995 | Wiener | 139/420 R |
| 5,597,194 | A * | 1/1997 | Daugherty et al. | 296/39.2 |
| 5,632,520 | A * | 5/1997 | Butz | 296/24.43 |
| 5,702,143 | A * | 12/1997 | Shimazaki | 296/24.43 |
| 5,711,568 | A * | 1/1998 | Diem et al. | 296/37.16 |
| 5,820,187 | A * | 10/1998 | Ament et al. | 296/24.43 |
| 5,958,549 | A * | 9/1999 | Jaegers et al. | 428/116 |
| 6,099,222 | A * | 8/2000 | Moore | 296/37.16 |
| 6,155,621 | A * | 12/2000 | Nishida et al. | 296/24.4 |
| 6,183,028 | B1 * | 2/2001 | Ament et al. | 296/24.43 |
| 6,325,436 | B1 * | 12/2001 | Ehrenberger et al. | 296/24.4 |
| 6,349,986 | B1 * | 2/2002 | Seel et al. | 296/37.16 |
| 6,390,526 | B1 * | 5/2002 | Ament et al. | 296/37.16 |
| 6,402,217 | B1 * | 6/2002 | Ament et al. | 296/37.16 |
| 6,592,165 | B2 * | 7/2003 | Ament et al. | 296/37.16 |
| 6,595,567 | B1 * | 7/2003 | Ament et al. | 296/24.43 |
| 6,598,921 | B2 * | 7/2003 | Seel et al. | 296/24.43 |
| 6,817,644 | B2 * | 11/2004 | Moore | 296/24.43 |
| 6,843,518 | B2 * | 1/2005 | Schlecht et al. | 296/24.34 |
| 6,966,591 | B2 * | 11/2005 | Schlecht | 296/37.16 |
| 7,048,319 | B2 * | 5/2006 | Ament et al. | 296/37.16 |
| 7,140,659 | B2 * | 11/2006 | Walter et al. | 296/37.16 |
| 7,207,613 | B2 * | 4/2007 | Walter et al. | 296/24.4 |
| 7,316,440 | B2 * | 1/2008 | Walter et al. | 296/37.16 |
| 2001/0033084 | A1 * | 10/2001 | Murray et al. | 296/24.1 |
| 2003/0062736 | A1 * | 4/2003 | Ulert et al. | 296/24.1 |
| 2007/0096487 | A1 * | 5/2007 | Woerner | 296/37.1 |
| 2007/0120391 | A1 * | 5/2007 | Hori et al. | 296/100.15 |

FOREIGN PATENT DOCUMENTS

| | | |
|---|---|---|
| DE | 103 23 605 A1 | 12/2004 |
| DE | 103 48 892 B4 | 5/2005 |
| EP | 1 524 153 A1 | 4/2005 |
| JP | 1-204836 | 8/1989 |

* cited by examiner

*Primary Examiner*—Kiran B. Patel

(57) ABSTRACT

A protective device for a loading space of a motor vehicle has at least one sheet-like structure that can be transferred alternatively into a vertical or into a horizontal protective position. The sheet-like structure has at least reduced light permeability in its horizontal protective position and increased light permeability in its vertical protective position. It is important that the sheet-like structure is configured as a spacer structure.

5 Claims, 2 Drawing Sheets

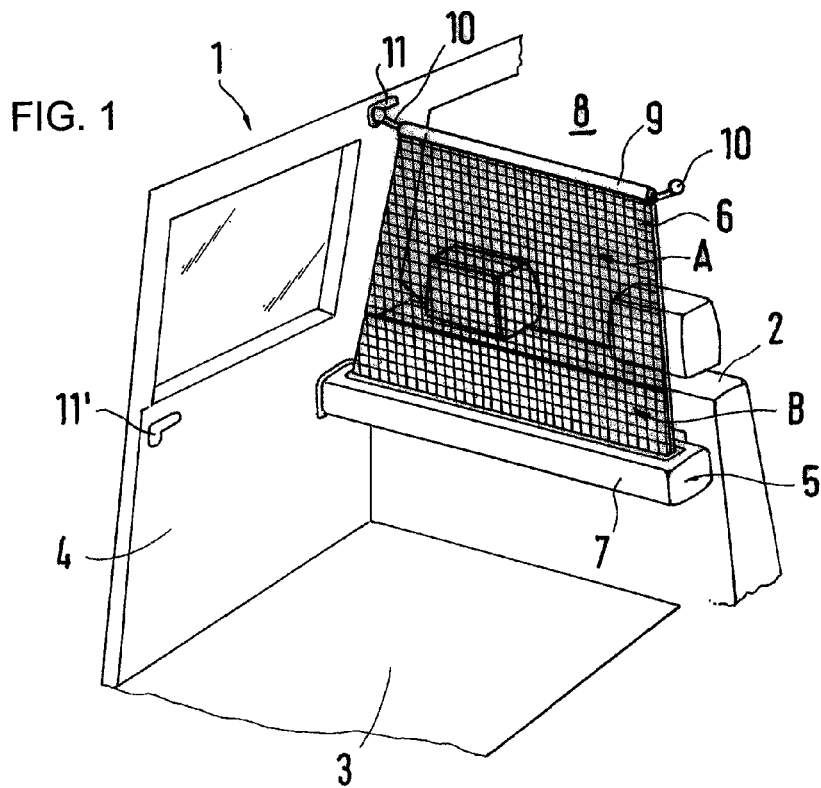
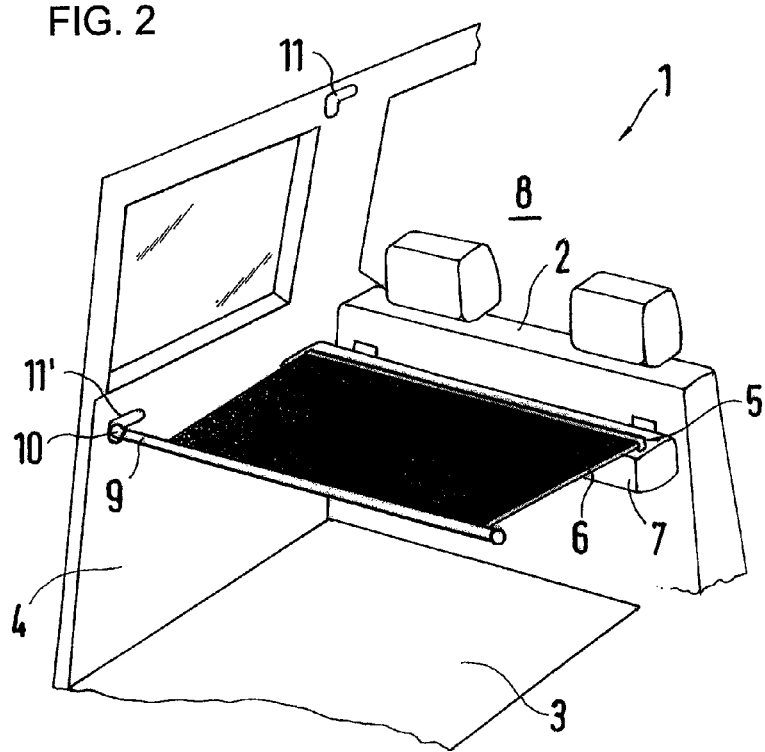

PROTECTIVE DEVICE FOR A LOADING SPACE

CROSS-REFERENCE TO RELATED APPLICATION

This application claims the priority, under 35 U.S.C. § 119, of German application DE 10 2006 034 635.1, filed Jul. 27, 2006; the prior application is herewith incorporated by reference in its entirety.

BACKGROUND OF THE INVENTION

Field of the Invention

The present invention relates to a protective device for a loading space of a motor vehicle, with at least one sheet-like structure. The sheet-like structure can be transferred alternatively into a vertical protective position or into an approximately horizontal protective position. The sheet-like structure has reduced light permeability in the horizontal protective position and increased light permeability in the vertical protective position.

Published, non-prosecuted German patent application DE 103 23 605 A1, corresponding to U.S. Pat. No. 6,966,591, discloses a protective device for a loading space of a motor vehicle, with at least one sheet-like structure which can be alternatively transferred into an approximately vertical protective position or into an approximately horizontal protective position. Measures are provided here for changing the light permeability of the sheet-like structure, which measures are coupled to a control device which activates the measures for changing the light permeability as a function of the sheet-like structure shifting between the two protective positions. This makes it possible to use an individual sheet-like structure both as a horizontal and as a vertical protective structure and, as a result, to obtain both a load-covering function and a separating device between a loading space and a passenger compartment. The sheet-like structure, in its horizontal protective position, forms protection against seeing or looking at loaded items disposed below it while, in its vertical protective position, it does not obstruct the view of the driver to the rear, in particular through a rearview mirror.

Drawbacks of the known protective device include the fact that it is complicated and expensive and, depending on the embodiment, contains a plurality of individual, interconnected slats or layers which impart to the sheet-like structure a third dimension, i.e. thickness, which is not to be underestimated.

SUMMARY OF THE INVENTION

It is accordingly an object of the invention to provide a protective device for a loading space which overcomes the above-mentioned disadvantages of the prior art devices of this general type, which is an improved embodiment that uses simple measures to permit variable protective functions and, has a small thickness.

With the foregoing and other objects in view there is provided, in accordance with the invention, a protective device for a loading space of a motor vehicle. The protective device contains at least one sheet-like structure being transferable alternatively into a vertical protective position or into an approximately horizontal protective position. The sheet-like structure has reduced light permeability in the horizontal protective position and increased light permeability in the vertical protective position. The sheet-like structure is configured as a spacer structure.

The present invention is based on the general concept of configuring the sheet-like structure of the protective device for the loading space of a motor vehicle as a three-dimensional, in particular textile, double-layer spacer structure. In this case, the sheet-like structure is disposed in a housing on a rear side of a backrest preferably in a manner such that it can be extended, and can be transferred alternatively into a vertical protective position or into an approximately horizontal protective position. The sheet-like structure has at least reduced, at best no, light permeability in its horizontal protective position and increased light permeability in its vertical protective position. The light permeability can be reduced in the horizontal protective position to such an extent that the sheet-like structure becomes non-transparent and, as a result, opaque. This enables items of luggage disposed below the sheet-like structure to be stowed opaquely and such that they are not visible from the outside. In its vertical protective position, the increased light permeability can lead to virtually complete transparency, and therefore, when the protective device is in a vertical protective position, a passenger compartment is reliably separated by the sheet-like structure from the luggage compartment disposed behind it, but at the same time the driver is not obstructed from looking back, for example through a rearview mirror.

The sheet-like structure expediently has two parallel layers, for example textile surface structure sections, and "spacers", for example pile threads, which reliably connect the two layers to each other. The two surface structure sections can be configured both as woven sections having warp and weft threads, or as a knitted article in which the spacers, for example pile threads, disposed generally perpendicularly thereto are incorporated. The spacers permit relative parallel displacement of the two surface structure sections to each other, as a result of which openings disposed in the two surface structure sections are either aligned or are displaced non-congruently in relation to each other. When the openings present in the two surface structure sections are aligned, the sheet-like structure becomes transparent while, if the openings of the two surface structure sections are not aligned, i.e. are not congruent, it becomes non-transparent, i.e. opaque. This makes it possible to simply change the light permeability ratios in the sheet-like structure, and therefore the latter can be transferred by a simple relative displacement of the two surface structure sections parallel to each other from an opaque into a transparent state and vice versa. At the same time, a spacer structure configured in such a manner has a very low thickness, in particular in the compressed state, as a result of which it can continue to be easily folded, rolled up or compressed.

The surface structure sections are expediently configured to be pierced, in particular see-through, for example are at least partially transparent, at least in some sections. A perforation is one possibility of passage openings which, as mentioned in the previous paragraph, when aligned with one another cause the sheet-like structure to be transparent while, if they are not aligned with one another, they make the sheet-like structure opaque. Since the sheet-like structure in its vertical protective position has to be extended to a significantly shorter extent than for its generally horizontal protective position, it is conceivable for a see-through possibility of this type to be provided only over the height of the vertical protective position, since it is desirable for the sheet-like structure to be transparent only in this region. If the sheet-like structure is transferred into its horizontal protective position in order to cover the luggage compartment, it has to be extended significantly further, the sheet-like structure not being of transparent configuration in this additional extension region, since this region only emerges in the horizontal protective position from a housing accommodating the sheet-like structure and, in any case, a view of the articles of luggage stored below the sheet-like structure is to be avoided.

In an advantageous embodiment of the solution according to the invention, the first surface structure section is formed from a light, reflective material while the second surface structure section is formed from a dark material. It is also to be observed, in the case of the protective device according to the invention, in a manner similar as in the case of inset screens mounted in window openings, that dark materials increase the transparency, and light, in particular of reflective materials, have an adverse effect on the transparency. This applies in particular to light background. When the sheet-like structure is in the vertical protective position, the driver sees through the sheet-like structure because of a relatively bright background while, when the sheet-like structure is in its horizontal protective position, a background is formed by the dark loading space. Accordingly, sheet-like structures made of dark material are particularly suitable.

In a further advantageous embodiment of the solution according to the invention, an orthogonal distance between the two surface structure sections is a few millimeters and depends in particular on the size of the apertures. One example size is approximately 1.5 mm to 2.5 mm. The spacers are flexible and, as a result, keep the thickness of the sheet-like structure relatively low in the not-in-use state, and therefore the latter can easily be rolled up, folded or compressed, as a result of which it can be adjusted more easily between a use position and a not-in-use position.

It goes without saying that the features mentioned above and those which have yet to be explained below can be used not only in the respectively stated combination but also in different combinations or on their own without departing from the framework of the present invention.

Other features which are considered as characteristic for the invention are set forth in the appended claims.

Although the invention is illustrated and described herein as embodied in a protective device for a loading space, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 1 is a diagrammatic, perspective views of a protective device with a sheet-like structure situated in a vertical protective position according to the invention;

FIG. 2 is a diagrammatic, view as in FIG. 1, but with the sheet-like structure situated in a horizontal protective position;

DETAILED DESCRIPTION OF THE INVENTION

Figure 3A:
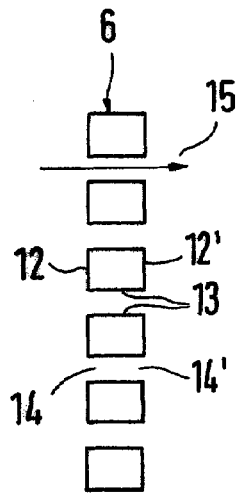
FIG. 3A is an illustration showing the sheet-like structure in a transparent state, i.e. with congruent surface structure sections.

Referring now to the figures of the drawing in detail and first, particularly, to FIG. 1 thereof, there is shown a partially illustrated motor vehicle 1 that has behind a rear seat back 2, as seen in a direction of travel, a loading space 3 in which non-illustrated loaded items, for example luggage, can be transported. The motor vehicle 1 shown in FIGS. 1 and 2 is configured here as a station wagon which is provided at the rear with a non-illustrated tailgate. In the state illustrated, the loading space 3 is bounded to the front by the rear seat back 2 and to the rear by the tailgate. To the sides, the loading space 3 is bounded by a respective vehicle sidewall 4 of which, according to FIGS. 1 and 2, only the left vehicle sidewall 4 is illustrated.

To secure the loading space 3, a protective device 5 is provided which is disposed substantially in the transverse direction of the vehicle on a side of the rear seat back 2 that faces the loading space 3, and has a sheet-like structure 6 and a housing 7. The sheet-like structure 6 is flexible, i.e. can be rolled up, compressed or folded, and, for example in the rolled-up state, can be stowed in the housing 7. As a result, the sheet-like structure 6 is accommodated in its not-in-use position in the housing 7 in a space-saving and protected manner. In order to permit simple extension of the sheet-like structure 6 from and retraction of the same into the housing 7, the sheet-like structure 6 can be rolled up in the housing 7 on a non-illustrated winding shaft which is subjected to the action of a force in the winding-up direction of the sheet-like structure 6 preferably by a non-illustrated restoring configuration, for example a restoring spring. The protective device 5 serves to secure the loading space 3 or to secure loaded items, for example luggage, disposed in the loading space 3.

Furthermore, the sheet-like structure 6 can alternatively be displaced into a vertical protective position (see FIG. 1) or into a horizontal protective position (see FIG. 2), but having increased light permeability in its vertical protective position and reduced light permeability in its horizontal protective position. According to FIG. 1, the sheet-like structure 6 is illustrated in its vertical protective position in which it separates the loading space 3 from a passenger compartment 8 situated in front of it in the direction of travel. In the vertical protective position, the increased light permeability, which at best allows the sheet-like structure 6 to appear transparent, ensures that the driver has an unobstructed view to the rear. This is particularly important in order to be able to observe traffic at the rear through the rearview mirror.

In order to fix the sheet-like structure 6 in its vertical protective position, on its front end region in the extension direction it has a rod 9 which has retaining elements 10 on the longitudinal end side which engage in corresponding receptacles 11 on the vehicle. In order to fix the sheet-like structure 6 in its horizontal protective position (see FIG. 2), the rod engages by its retaining elements 10 disposed on the longitudinal end side in a respective receptacle 11' disposed on the vehicle.

As can be seen from the illustrations according to FIGS. 1 and 2, the sheet-like structure 6 is virtually transparent in its vertical protective position and, as a result, permits a vehicle occupant to have an unhindered view to the rear while it is virtually non-transparent in its horizontal protective position according to FIG. 2 and, as a result, prevents a view of loaded items stowed below the sheet-like structure 6. The change in the light permeability between the vertical and the horizontal protective position is achieved in that the sheet-like structure 6 is configured as a spacer structure, for example as a pile fabric, and has two parallel, textile surface structure sections 12, 12' (see FIGS. 3 and 4) and spacers 13, for example pile threads, connecting them. An orthogonal distance between the two surface structure sections 12, 12' is a few millimeters here, in particular approximately 1.5 mm to 2.5 mm, and therefore the sheet-like structure 6 as a whole has a very low thickness which permits easy rolling up, folding or compression.

Figure 3B:
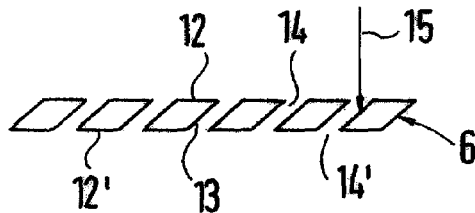
FIG. 3B is an illustration as in FIG. 3A, but in a non-transparent state.

The light permeability of the sheet-like structure 6 is achieved according to the invention by the two surface structure sections 12, 12' being pierced, in particular perforated, at least in some sections and/or having aperture openings 14, 14', the apertures of the two surface structure sections 12, 12' being congruent in the transparent state (see FIG. 3A) but they are not congruent in the case of a non-transparent sheet-like structure 6, as shown in FIG. 3B. FIG. 3A shows the sheet-like structure 6 in its vertical protective position in which the respective aperture openings 14, 14' of the two surface structure sections 12, 12' are disposed in alignment, and therefore a light beam 15 can penetrate the sheet-like structure 6 unhindered. This is not possible in the case of the sheet-like structure 6 situated in the horizontal protective position, as shown in FIG. 3B, since the light beam 15 cannot penetrate the sheet-like structure 6.

As mentioned above, the apertures on the two surface structure sections 12, 12' are disposed at least in some sections, and therefore it is conceivable that the apertures 14 are provided only in section A while section B (see FIG. 1) is constructed entirely without apertures. A longitudinal extension I of the section A in the extension direction of the sheet-like structure 6 is preferably the same length as a distance between an upper edge of the rear seat back 2 and a head liner of the motor vehicle 1. It is likewise conceivable for the sheet-like structure 6 to have warp and/or weft threads and/or spacers 13 made from yarn.

In general, one or both surface structure sections 12, 12' can be formed from identical or differently colored material, and therefore it is conceivable for the first surface structure section 12 to be formed from a light, reflective material while the second surface structure section 12' is formed from a dark material.

Figure 4:
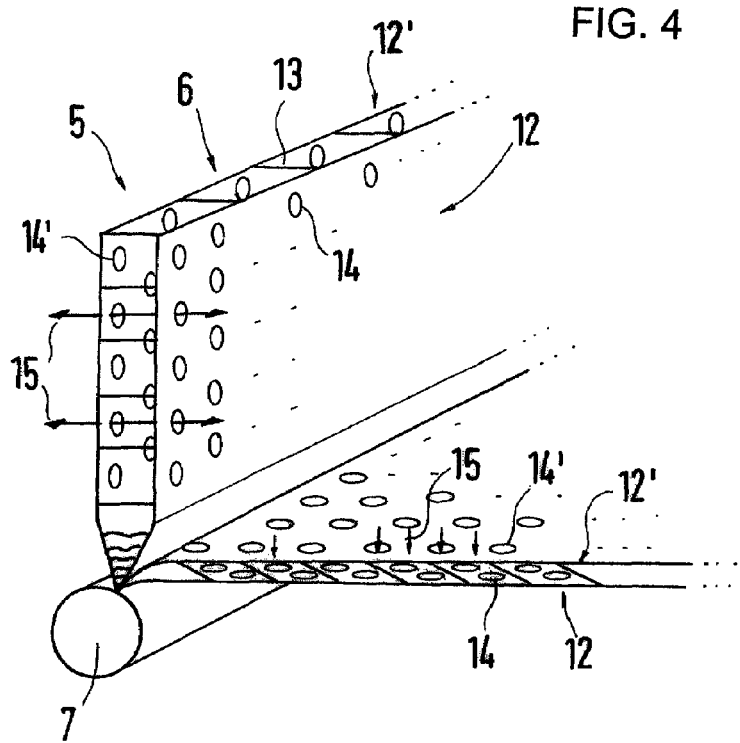
FIG. 4 is a diagrammatic, sectional view of the protective device according to the invention, both in the vertical and horizontal protective position.

According to FIG. 4, the surface structure 6 is shown in its vertical and horizontal protective position such that the manner of operation of the sheet-like structure 6, which is configured as a spacer structure, can be clarified. In its vertical protective position, the aperture openings 14, 14' of the two surface sections 12, 12' are congruent or aligned, and therefore a light beam 15 can pass virtually unhindered through the sheet-like structure 6 and the latter can appear transparent. By contrast, in its horizontal protective position, the aperture openings 14, 14' of the two surface structure sections 12, 12' are not congruent, and therefore beams 15 can penetrate the sheet-like structure 6 only with difficulty and the latter, as a result, can appear opaque.

The invention claimed is:

1. A protective device for a loading space of a motor vehicle, the protective device comprising:
at least one sheet-shaped structure being transferable alternatively into a vertical protective position or into an approximately horizontal protective position, said sheet-shaped structure having reduced light permeability in said horizontal protective position and increased light permeability in said vertical protective position, said sheet-shaped structure configured as a spacer structure, said spacer structure having two parallel, textile surface structure sections and spacers connecting said textile surface structure sections said textile surface structure sections having apertures formed therein at least in some sections, said spacer structure being constructed so that respective ones of said apertures of said two textile surface structure sections are congruent in said vertical protective position and are not congruent in said horizontal protective position.

2. The protective device according to claim 1, wherein a first of said textile surface structure sections is formed from a light, reflective material and a second of said textile surface structure sections is formed from a dark material.

3. The protective device according to claim 1, further comprising a housing into which said sheet-shaped structure can be at least one of rolled up, compressed and folded in a not-in-use position.

4. The protective device according to claim 1, wherein an orthogonal distance between said two textile surface structure sections is in a range of 1.5 mm to 2.5 mm.

5. The protective device according to claim 1, wherein said sheet-shaped structure has at least one of warp threads, weft threads, and spacers made of yarn.

* * * * *